United States Patent
Guan

(10) Patent No.: US 8,238,363 B2
(45) Date of Patent: Aug. 7, 2012

(54) METHOD AND APPARATUS FOR A DUAL-STACK MN TO ROAMING IN AN IPV4 NETWORK

(75) Inventor: Hongguang Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 678 days.

(21) Appl. No.: 12/330,918

(22) Filed: Dec. 9, 2008

(65) Prior Publication Data

US 2009/0086668 A1 Apr. 2, 2009

Related U.S. Application Data

(63) Continuation of application No. PCT/CN2007/070100, filed on Jun. 11, 2007.

(30) Foreign Application Priority Data

Jun. 9, 2006 (CN) .......................... 2006 1 0082811

(51) Int. Cl.
*H04W 60/00* (2009.01)
(52) U.S. Cl. ........................................ 370/465; 370/475
(58) Field of Classification Search .................. 370/465, 370/475
See application file for complete search history.

(56) References Cited

U.S. PATENT DOCUMENTS

| | | | |
|---|---|---|---|
| 6,992,994 B2 | 1/2006 | Das et al. | |
| 2003/0236914 A1* | 12/2003 | Liu | 709/245 |
| 2005/0099976 A1 | 5/2005 | Yamamoto et al. | |
| 2007/0245000 A1 | 10/2007 | Chen et al. | |
| 2009/0116452 A1* | 5/2009 | Guan | 370/331 |

FOREIGN PATENT DOCUMENTS

| | | | |
|---|---|---|---|
| CA | 2 563 911 A1 | 11/2005 | |
| CN | 1663218 A | 8/2005 | |
| CN | 1691668 A | 11/2005 | |
| JP | 2003018185 A | 1/2003 | |
| JP | 2005086256 A | 3/2005 | |
| JP | 2005102231 A | 4/2005 | |
| WO | 2004/049668 A | 6/2004 | |
| WO | WO 2004/049668 A1 | 6/2004 | |

(Continued)

OTHER PUBLICATIONS

European Office Action (Dec. 10, 2009).

(Continued)

*Primary Examiner* — Melvin Marcelo
(74) *Attorney, Agent, or Firm* — Leydig, Voit & Mayer, Ltd.

(57) ABSTRACT

The disclosure provides a method and apparatus for a dual-stack Mobile Node (MN) to roam in an IPv4 network. The apparatus mainly includes a Foreign Home Agent (FHA). The method mainly includes: acquiring, by the MN, a temporary IPv4 address THOA that the FHA assigns to the MN, and registering its IPv4 Care-of Address (COA) in the FHA; and delivering, by the FHA, a packet between the MN and a Corresponding Node (CN) or Home Agent (HA), according to information about the IPv4 COA, which is assigned for the MN and has been registered by the MN in the FHA. With the method of the invention, a routing solution may be implemented for a dual-stack MN to roam from an IPv6 network to an IPv4 network.

14 Claims, 3 Drawing Sheets

FOREIGN PATENT DOCUMENTS

| WO | 2004/084492 A1 | 9/2004 |
| WO | WO 2005/025170 A1 | 3/2005 |
| WO | 2005/107178 A1 | 11/2005 |
| WO | WO 2007143950 A1 * | 12/2007 |

OTHER PUBLICATIONS

PCT Written Opinion of the International Searching Authority (Sep. 6, 2007).

Calhoun et al., "IPv6 Over Mobile IPv4," IETF Internet Draft, 1-11 (Oct. 2002) http://draft-mccann-mobileip-ipv6mipv4-03.txt.

Notice of Opposition in corresponding European Application No. 07721721.4 (Jun. 1, 2011).

Calhoun et al., "IPv6 over Mobile IPv4," Mobile IP, Internet Draft, Oct. 2002.

Johnson et al., "RFC 3775—Mobility Support in IPv6," Network Working Group, Jun. 2004, The Internet Society, Reston, Virginia.

Montengro, "RFC 2344—Reverse Tunneling for Mobile IP," Network Working Group, May 1998, The Internet Society, Reston, Virginia.

Perkins, "RFC 3344—IP Mobility Support IPv4," Network Working Group, Aug. 2002, The Internet Society, Reston, Virginia.

$1^{st}$ Office Action in corresponding Chinese Application No. 200610082811.6 (Sep. 5, 2008).

Rejection Decision in corresponding Japanese Application No. 2009-513540 (Sep. 26, 2011).

* cited by examiner

METHOD AND APPARATUS FOR A DUAL-STACK MN TO ROAMING IN AN IPV4 NETWORK

CROSS-REFERENCE TO RELATED APPLICATIONS

This application is a continuation of International Patent Application No. PCT/CN2007/070100, filed Jun. 11, 2007, which claims priority to Chinese Patent Application No. 200610082811.6, filed Jun. 9, 2006, both of which are hereby incorporated by reference in their entirety.

FIELD OF THE INVENTION

The invention relates to the field of network communications, and, more particularly, to method and apparatus for a dual-stack Mobile Node (MN) roaming in an IPv4 network.

BACKGROUND

In the existing Transmission Control Protocol (TCP) or Internet Protocol (IP) framework, the IP address of a MN represents the location of the MN. When a Corresponding Node (CN) sends a packet to the MN, the route is determined by the network in which the IP address of the MN resides. When the MN moves from its home network to a foreign network, a packet destined for the MN is still routed to the home network of the MN. In view of the fact that the MN is not within its home network, the packet will be discarded at the home network of the MN, and, accordingly, the communication between the MN and the CN is broken down.

With development of the mobile communication technology, future mobile networks must be based on IP, and the existing communication is required not to be broken down, even when the MN roams or migrates to a foreign network from its home network. The traditional TCP or IP cannot meet such requirement for the above mobile communication. Then, Internet Engineering Task Force (IETF) proposes Mobile IPv4 (MIP4) and Mobile IPv6 (MIP6).

MIP4 and MIP6 provide methods, which allow a MN to perform communication by still using its home IP address, even when roaming across IPv4 and IPv6 networks, respectively.

MIP4 provides a triangle routing mode. In the triangle routing mode, because a CN does not know whether a MN has moved, a packet destined for the MN is still sent directly to the home address of the MN. After the packet is routed to the Home Agent (HA) of the MN, it is sent by the HA to the Care-of Address (COA) of the MN through a tunnel. Data destined for the CN from the MN is directly sent to the CN.

MIP6 provides two routing mechanisms: a bi-directional tunnel mode and a route optimization mode.

In the bi-directional tunnel mode, a packet destined for a MN is still sent directly to the home address of the MN, because a CN does not know whether the MN has moved. After the packet is routed to the Home Agent (HA) of the MN, it is sent by the HA to the Care-of Address (COA) of the MN through a tunnel. Data destined for the CN from the MN is sent to the HA through a tunnel, and then is sent to the CN by the HA.

In the route optimization mode, a MN registers with a CN first, and then data sent from the MN to the CN skips the HA and is sent to the CN directly. Data sent from the CN to the MN also skips the HA and is sent to the COA of the MN directly.

The IPv4 and IPv6 networks will co-exist for a long time. Then, it is likely that a mobile node may roam across the IPv4 and IPv6 networks. Such a MN roaming across the IPv4 and IPv6 networks is referred to as a dual-stack MN. In the conventional implementations, both the HA and the MN are required to support dual-stack, to have both IPv4 and IPv6 addresses, and to support both MIPv4 and MIPv6.

In the prior art, there is a solution when a dual-stack MN roams into an IPv4 network, in which a Tunnel Broker technique is used for the dual-stack MN to roam in the IPv4 network. The MN accesses the IPv4 network through a Tunnel Broker, and routing in the IPv4 network is performed by the Tunnel Broker.

In implementation of the present invention, the inventors have found that the above solution when the dual-stack MN roams into the IPv4 network has some drawbacks as follows.

1. A lot of Tunnel Brokers have to be deployed, and the networking cost is too high, accordingly.

2. The conventional Tunnel Broker technique has to be relied on greatly, but the outlook of this technique is uncertain.

Another prior art solution for a dual-stack MN is to allow the dual-stack MN to obtain an IPv4 address in an IPv6 network.

In implementation of the present invention, the inventors have found that said another prior art solution for a dual-stack MN also has some drawbacks. That is, only a method is provided for the dual-stack MN to obtain an IPv4 address in an IPv6 network, but no method is provided for the MN to roam across the IPv4 and IPv6 networks.

Another prior art solution for interworking between IPv4 and IPv6 is to interwork between IPv4 and IPv6 in the form of Protocol Translator (PT) or tunnel.

In implementation of the present invention, the inventors have found that said other prior art solution for interworking between IPv4 and IPv6 has a drawback, in that the problem in mobile IP cannot be solved. Additionally, in the NAT or PT manner, the packet header has to be modified, which will cause many problems.

SUMMARY

An object of the embodiments of the invention is to provide a method and apparatus for a dual-stack Mobile Node (MN) to roam in an IPv4 network, so as to implement a routing solution for the dual-stack MN to roam from an IPv6 network to an IPv4 network.

The object of the invention is implemented with the following technical solution.

According to an embodiment of the present invention, a Foreign Home Agent (FHA) includes a registration management module and a routing management module; wherein the registration management module is configured to assign a temporary IPv4 address THOA to a Mobile Node (MN), deliver information about the THOA to the routing management module, accept the MN to register an IPv4 Care-of Address (COA) with it, and save the mapping relationship between the IPv4 COA registered by the MN and the THOA; and the routing management module is configured to de-capsulate an IPv4 packet to be sent from the MN to a Home Agent (HA) or Corresponding Node (CN) into an IPv6 packet, send the IPv6 packet to the HA or CN, encapsulate an IPv6 packet to be sent from the HA or CN to the MN into an IPv4 packet, and send the IPv4 packet to the MN, according to the information about the THOA delivered from the registration management module.

According to another embodiment of the present invention, a system for a dual-stack Mobile Node, MN, to roam in an IPv4 network, comprising a mobile node, MN, and a Foreign Home Agent, FHA; wherein the MN is configured to acquire a temporary IPv4 address, THOA, and the corresponding IPv6 Care-of Address, COA, to the THOA; acquire a IPv4 COA, then register the IPv4 COA with the FHA; the FHA is configured to accept the MN to register the IPv4 COA with it, and save the mapping relationship between the IPv4 COA registered by the MN and the THOA; and deliver a packet between the MN and a Home Agent, HA, or a Corresponding Node, CN.

According to another embodiment of the present invention, a method for a dual-stack Mobile Node (MN) to roam in an IPv4 network includes: providing the MN with a THOA assigned for the MN, by a Foreign Home Agent (FHA), and accepting the MN to register the THOA and the MN's IPv4 Care-of Address (COA) in the FHA; and delivering a packet between the MN and a Home Agent (HA) or Corresponding Node (CN), by the FHA, according to information about the THOA and the IPv4 COA.

From the above technical solution provided in embodiments of the invention, it can be seen that a Foreign Home Agent (FHA) is provided in embodiments of the invention and the MN may communicate with the CN or HA through the FHA. Thereby, a routing solution may be implemented for the dual-stack MN to roam from the IPv6 network to the IPv4 network. Moreover, the implementation of the solution is simple and the networking cost is low.

DETAILED DESCRIPTION

Embodiments of the present invention provide a method and apparatus for a dual-stack Mobile Node (MN) to roam in an IPv4 network. In embodiments of the invention, a FHA is provided within the boundary range of an IPv6 network and an IPv4 network or within a hybrid network that may function as both an IPv6 network and an IPv4 network. After the MN roams from the IPv6 network to the IPv4 network, it may communicate with the CN or HA through the FHA.

Figure 1:
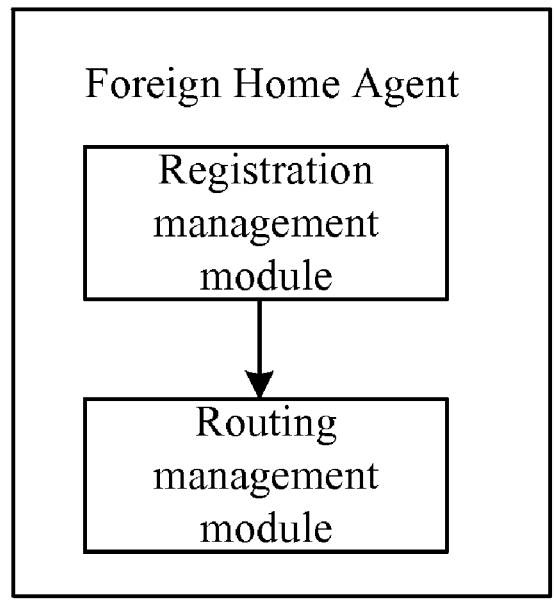
FIG. 1 illustrates the configuration of an apparatus, according to an embodiment of the present invention.

Detailed descriptions are given below to the embodiments of the invention with reference to accompanying drawings. The apparatus according to the embodiments of the invention may include a FHA, the configuration of which is shown in FIG. 1.

The FHA supports both MIp4 and MIp6. The mapping relationship between the IPv4 COA and THOA of the MN is saved in the FHA, and the MN is assigned THOA, in accordance with the mapping relationship. The registration of the MN is accepted and the registration information is saved in the FHA. When the registration of the MN expires, the FHA deletes the above mapping relationship of the MN and the registration information. The FHA, which also acts as a Home Agent (HA) of the MN in the IPv4 network, may encapsulate an IPv6 packet to be sent from the HA or CN to the MN into an IPv4 packet, and de-capsulate an IPv4 packet to be sent from the MN to a HA or CN. The FHA may include a registration management module and a routing management module. The FHA is provided within the boundary range of an IPv6 network and an IPv4 network, or within a hybrid network that may function as both an IPv6 network and an IPv4 network.

The registration management module is configured to accept the MN to register with it an IPv4 Care-of Address (COA) obtained from an FA, assign a THOA to the MN, and deliver information about the THOA to the routing management module. The mapping relationship between the IPv4 COA registered by the MN and the THOA and the registration information of the MN is saved. When a proxy registration is employed, the registration management module, which acts as an agent of the MN, registers with the HA or CN.

The routing management module is configured to de-capsulate an IPv4 packet to be sent from the MN to a HA or CN into an IPv6 packet, and send the IPv6 packet to the HA or CN, encapsulate an IPv6 packet to be sent from the HA or CN to the MN into an IPv4 packet, according to the information about the THOA delivered from the routing management module, and send the IPv4 packet to the MN.

Figure 2:
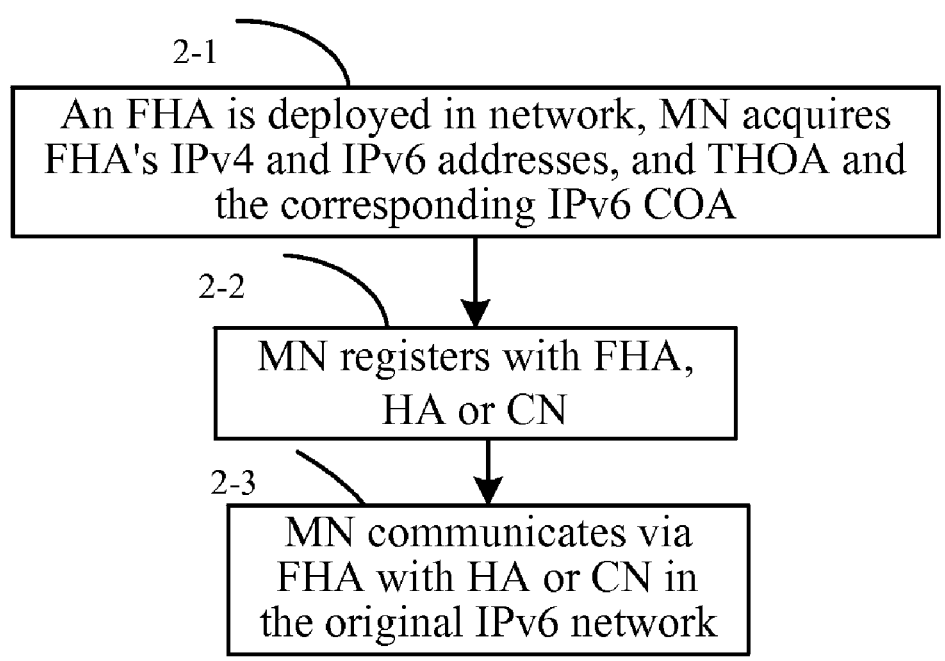
FIG. 2 is a flow chart showing a method, according to an embodiment of the present invention.

The method for a dual-stack MN to roam in an IPv4 network according to an embodiment of the invention is shown in FIG. 2, including the following steps.

Step 2-1: A FHA is provided in the network, and the MN acquires the IPv4 and IPv6 addresses of the FHA, the THOA, and the corresponding IPv6 COA.

In embodiments of the invention, a FHA is provided in the boundary range of an IPv6 network and an IPv4 network. The FHA supports both MIP4 and MIP6, and has both IPv6 and IPv4 addresses.

When a MN moves from the IPv6 network to the IPv4 network, the MN acquires the IPv6 and IPv4 addresses of the FHA, and acquires the THOA and the corresponding IPv6 COA from the FHA.

The method for the MN to acquire the IPv6 and IPv4 addresses of the FHA and the THOA and the corresponding IPv6 COA from the FHA may include a static configuration method, a HTTP based method, and a bootstrapping method. The three methods will be described below, respectively.

The static configuration method: When the static configuration method is used, the IPv6 and IPv4 addresses of the FHA are configured directly on the MN. The THOA and the corresponding IPv6 COA are also configured thereon.

The HTTP based method: Before the MN switches from the IPv6 network to the IPv4 network, the MN may acquire the IPv6 and IPv4 addresses of the FHA and acquire the THOA and the corresponding IPv6 COA via HTTP. After the MN switches from the IPv6 network to the IPv4 network, if an IPv4 address (for example, a COA) may be acquired in the IPv4 network, the MN may communicate with the FHA by using this IPv4 address via HTTP, so as to acquire the IPv6 and IPv4 addresses of the FHA and acquire the THOA and the corresponding IPv6 COA.

The bootstrapping method: If the MN has moved into the IPv4 network and is not assigned an IPv4 address, the bootstrapping method may be used to acquire the IPv6 and IPv4 addresses of the FHA, and acquire the THOA and the corresponding IPv6 COA.

Step 2-2: The MN registers with the FHA, HA, or CN.

After the MN has moved into the IPv4 network, the MN will acquire an IPv4 COA from the FA, and the FHA will act as a foreign home agent of the MN. In this way, the MN needs to register the above IPv4 COA acquired from the FA in the FHA. In the registration process, MIP4 is used and the MN may send registration information to the FHA directly, or send registration information to the FA, which, in turn, forwards the registration information to the FHA. Alternatively, the FA, which acts as an agent of the MN, may send the registration information to the FHA.

The MN also registers with the HA or CN in the original IPv6 network. The registration method may include a direct registration and an agent registration. When direct registration is performed, the MN registers its IPv6 COA with the HA or CN directly via MIP4, the IPv6 COA is the above IPv6 COA mapped with the THOA. When agent registration is performed, the FHA, on behalf of the MN, registers the above IPv6 COA with the HA or CN.

Step 2-3: The MN communicates with a HA or CN in the original IPv6 network through the FHA.

After the above FHA discovery and the registration process, the MN may communicate with a HA or CN in the original IPv6 network through the FHA.

The routing process for the MN to send a packet to the HA or CN is as follows.

1. In embodiments of the present invention, the MN communicates with the HA or CN by using IPv6 and MIP6. In this way, a packet sent from the MN to the HA or CN is an IPv6 packet. The IPv6 protocol stack of the MN delivers the generated IPv6 packet destined for the HA or CN to its own IPv4 protocol stack. The IPv6 packet is encapsulated by the IPv4 protocol stack into an IPv4 packet, the source address of which is the THOA, and the destination address of which is the IPv4 address of the FHA.

2. The MN sends the encapsulated IPv4 packet to the FA, which, in turn, routes the IPv4 packet to the FHA. When there is source address filtering in the FA routing, the FA has to support reverse tunneling.

3. Upon receipt of the IPv4 packet forwarded from the FA, the FHA removes the IPv4 encapsulation of the IPv4 packet, and forwards the inner IPv6 packet to the destination HA or CN in the IPv6 network.

Figure 3:
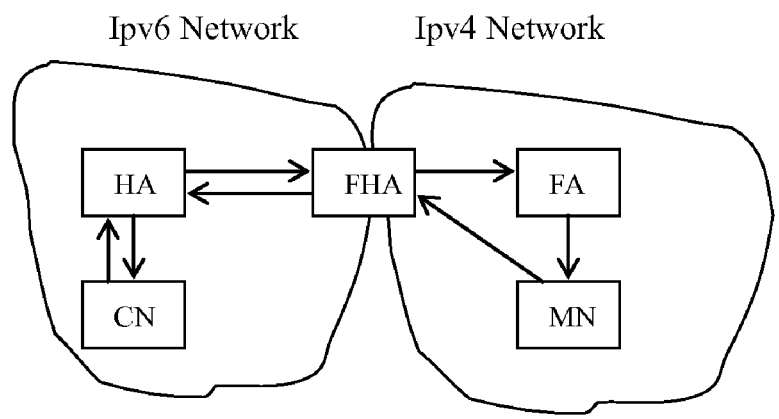
FIG. 3 is a diagram showing communication between a MN and a CN by using a tunnel mode, when a FHA is provided within the boundary range of an IPv6 network and an IPv4 network, according to an embodiment of the present invention.
Figure 4:
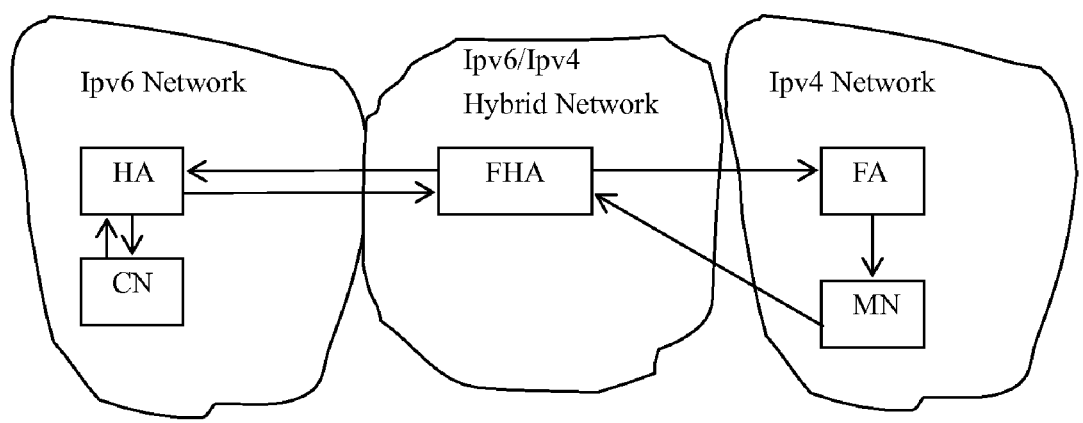
FIG. 4 is a diagram showing communication between a MN and a CN by using a route optimization mode, when a FHA is provided within a hybrid network that may function as both an IPv6 network and an IPv4 network, according to an embodiment of the present invention.

When the MN communicates with the CN in a tunnel mode, the FHA sends the packet destined for the CN from the MN to the HA first, which in turn forwards the packet to the CN. When the FHA is provided within the boundary range of an IPv6 network and an IPv4 network, the MN and the CN communicate by using a tunnel mode, as shown in FIG. 3. When the FHA is provided within a hybrid network that may function as both an IPv6 network and an IPv4 network, the MN and the CN communicate by using a tunnel mode, as shown in FIG. 4.

Figure 5:
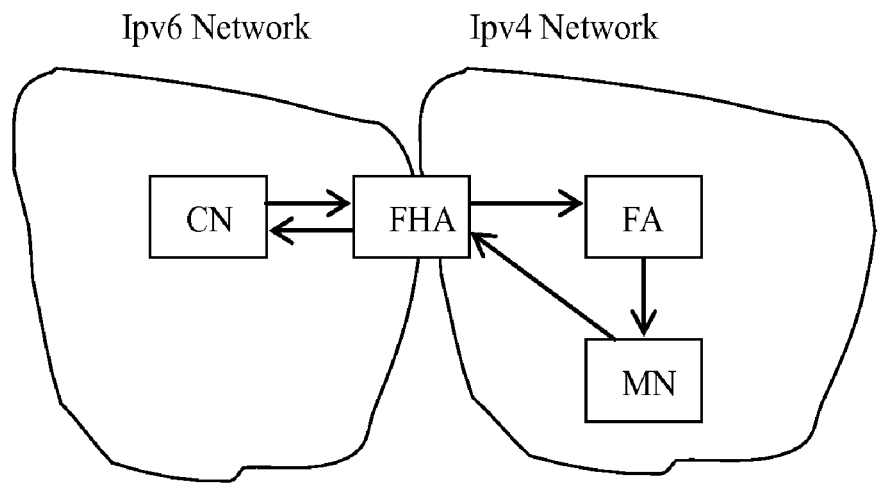
FIG. 5 is a diagram showing communication between a MN and a CN by using a route optimization mode, when a FHA is provided within the boundary range of an IPv6 network and an IPv4 network, according to an embodiment of the present invention.
Figure 6:
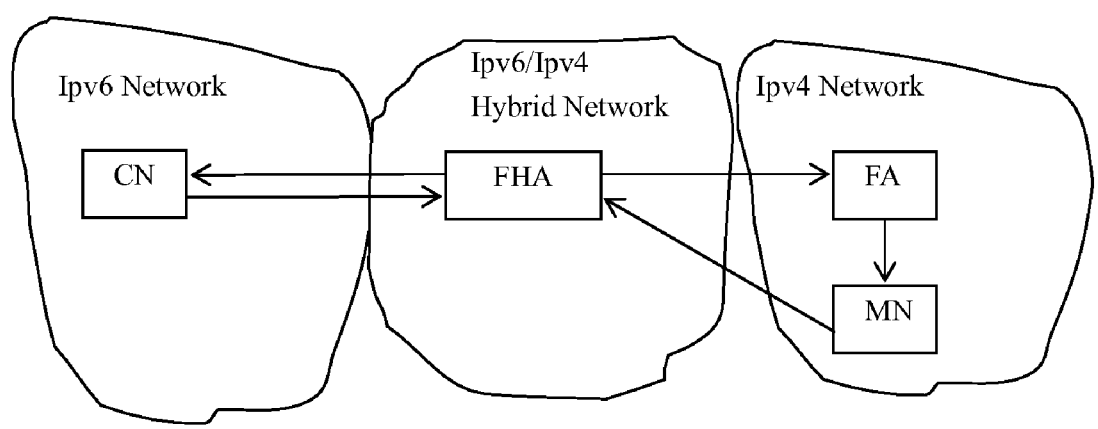
FIG. 6 is a diagram showing communication between a MN and a CN by using a tunnel mode, when a FHA is provided within a hybrid network that may function as both an IPv6 network and an IPv4 network, according to an embodiment of the present invention.

When the MN communicates with the CN in a route optimization mode, the FHA sends the packet destined for the CN from the MN to the CN directly. When the FHA is provided within the boundary range of an IPv6 network and an IPv4 network, the MN and the CN communicate by using a route optimization mode, as shown in FIG. 5. When the FHA is provided within a hybrid network that may function as both an IPv6 network and an IPv4 network, the MN and the CN communicate by using a routing optimization mode, as shown in FIG. 6.

The routing process for the MN to receive a packet sent from the HA or CN is as follows.

1. Because the COA registered with the HA or CN by the MN is an IPv6 COA acquired from the FHA, an IPv6 packet to be sent from the HA or CN to the MN will be routed to the FHA in the IPv6 network. Upon receipt of the IPv6 packet destined for the MN, the FHA encapsulates the IPv6 packet into an IPv4 packet, the source address of which is the THA, and the destination address of which is the THOA.

When the MN communicates with the CN by using a tunnel mode, a packet to be sent from the CN to the MN is sent first to the HA, which, in turn, forwards the packet to the FHA. When the MN communicates with the CN by using a route optimization mode, a packet to be sent from the CN to the MN is sent to the FHA directly.

2. A tunnel is established between the FHA and the MN. The address at one end of the tunnel is the FHA's address and the address at the other end is the MN's IPv4 COA. The FHA then performs IPv4 tunnel encapsulation on the packet from the CN by using MIP, and sends the packet to the MN's corresponding IPv4 COA.

3. After the MN receives the packet sent from the FHA, it performs tunnel de-capsulation on the packet, so as to obtain the IPv4 packet encapsulated by the FHA. The MN may further de-capsulate the IPv4 packet, so as to obtain the IPv6 packet sent from the HA or CN. Afterwards, the de-capsulated IPv6 packet is handed to the MN's IPv6 protocol stack for processing. The MN's IPv6 protocol stack processes the IPv6 packet, according to MIP6. In this manner, data processing is completed.

In the above process flow of the method according to embodiments of the invention, the requirements for the operations of the MN, HA, FHA, and CN are as follows.

The operation of the MN: In the FHA discovery mechanism, before the MN moves into an IPv4 network, the IPv4 and IPv6 addresses of the FHA may be acquired via HTTP method, and then the THOA and the corresponding IPv6 COA may be acquired from the FHA.

After the MN requests the THOA from the FHA, the MN registers with the FHA periodically.

When the MN communicates with the CN and HA by using IPv6 and MIP6 in the IPv4 network, an IPv6 packet has to be encapsulated into an IPv4 packet.

The operation of the HA: The HA does not know that the MN has moved into the IPv4 network, and, therefore, the HA communicates by using MIP6 in the invention.

The operation of the FHA: The FHA accepts the registration of the MN, assigns a THOA to the MN, acts as a HA of the MN in the IPv4 network, encapsulates an IPv6 packet destined for the MN into an IPv4 packet, and decapsulates an IPv4 packet destined for the CN or HA. The FHA is also responsible for management of the MN.

The FHA maintains a registration table in which the mapping between the MN's IPv4 COA and the THOA is saved, and another registration table in which the mapping table between the THOA and the MN's IPv6 COA is saved. Once the registration expires, the FHA removes information from the mapping table and information from the registration table.

The operation of the CN: The CN does not know that the MN has moved into the IPv4 network, and, therefore, according to the invention, the CN communicates by using only MIP6.

The embodiments of the present invention may inherit the existing security policies of MIP6. Additionally, a security association is established between the MN and the FHA, according to the embodiments of the present invention. The security association between the MN and the FHA may be implemented in the FHA discovery mechanism, or in the MN's bootstrapping.

The process flow of the method according to embodiments of the invention may be applied to scenarios as follow.

Scenario 1: The MN has a dual-stack, and supports MIP4 or supports both MIP4 and MIP6. The MN has an IPv6 home address, but has no IPv4 home address. The HA of the MN only has an IPv6 address, and only supports MIP6. The access router in the access network to which the MN belongs only supports IPv4 and MIP4. The MN has a COA.

Scenario 2: The MN has a dual-stack, and supports MIP4 or supports both MIP4 and MIP6. The MN has an IPv6 home address, but has no IPv4 home address. The HA of the MN only has an IPv6 address, and only supports MIP6. The access router in the access network to which the MN belongs only supports IPv4 and MIP4. The MN has a COA.

Scenario 3: The MN has a dual-stack, and supports MIP4 or supports both MIP4 and MIP6. The MN has an IPv6 home address, but has no IPv4 home address. The HA of the MN has IPv4 and IPv6 address, and supports both MIP4 and MIP6. The access router in the access network to which the MN belongs only supports IPv4 and MIP4. The MN has a COA.

Scenario 4: The MN has a dual-stack, and supports MIP4 or supports both MIP4 and MIP6. The MN has an IPv6 home address, but has no IPv4 home address. The HA of the MN has IPv4 and IPv6 address, and supports both MIP4 and MIP6. The access router in the access network to which the MN belongs only supports IPv4 and MIP4. The MN has a COA.

As described above, the embodiments of the invention disclosed a routing solution for a dual-stack MN to roam from an IPv6 network to an IPv4 network. The solution is easy to be implemented, and the networking cost is low. In the embodiments of the invention, a FHA is used to manage a MN, and the operability is good. Current MIP4 and MIP6 are supported, and there is no conflict with existing protocols. In the embodiments of the invention, the requirement for HA is low. The HA is only required to support MIP6, and the MN is only required to have an IPv6 home address.

While the invention has been descried above with reference to specific embodiments, the scope of the invention is not limited hereto. According to the disclosure of the invention, various changes and substitutions conceivable to those skilled in the art fall within the scope of the invention. The scope of the invention is, therefore, determined by the appended claims.

What is claimed is:

1. A Foreign Home Agent (FHA), comprising:
a registration management module; and
a routing management module;
wherein the registration management module is configured to
provide a mobile node (MN) with information about an IPv4 address and an IPv6 address of the FHA, and information about a Temporary Home Address (THOA) assigned for the MN by the FHA and information about an IPv6 Care of Address (COA) corresponding to the THOA,
accept the MN to register the information about the THOA and information about an IPv4 COA acquired from a Foreign Agent (FA) in the FHA, and
register the IPv6 COA corresponding to the THOA in a Corresponding Node (CN) or a Home Agent (HA); and
wherein the routing management module is configured to:
de-capsulate a first IPv4 packet to be sent from the MN to the HA, or the CN, into a first IPv6 packet;
send the first IPv6 packet to the HA or CN;
encapsulate a second IPv6 packet to be sent from the HA or CN to the MN into a second IPv4 packet and send the second IPv4 packet to the MN according to relationship between the IPv4 COA and the THOA.

2. The FHA according to claim 1, wherein the registration management module, which acts as an agent of the MN, registers with the HA or CN when a proxy registration is employed.

3. The FHA according to claim 1, wherein the FHA is provided within the boundary range of an IPv6 network and an IPv4 network, or in a hybrid network that functions as both an IPv6 network and an IPv4 network.

4. The FHA according to claim 1, wherein the registration management module is further configured to deliver information about the THOA to the routing management module.

5. A method for a dual-stack Mobile Node (MN), to roam in an IPv4 network, comprising:
providing the MN with information about an IPv4 address and an IPv6 address of an FHA, and information about a Temporary Home Address (THOA) assigned for the MN by the FHA and information about an IPv6 COA corresponding to the THOA;
accepting, by the FHA, the MN to register the information about the THOA and information about an IPv4 COA acquired from a Foreign Agent (FA) in the FHA;
registering the IPv6 COA corresponding to the THOA in a Corresponding Node (CN) or a Home Agent (HA); and
delivering a packet between the MN and the HA, or CN, by the FHA, according to the information about the THOA and the IPv4 COA.

6. The method according to claim 5, wherein providing the MN with information about the IPv4 address and IPv6 address of an FHA, and information about a THOA assigned for the MN by the FHA and information about an IPv6 COA corresponding to the THOA, further comprises at least one of the following:
configuring the IPv4 address and IPv6 address of the FHA and the information about the THOA and the IPv6 COA corresponding to the THOA on the MN directly;
acquiring, by the MN, the IPv4 address and IPv6 address of the FHA, and acquiring the information about the THOA and the IPv6 COA corresponding to the THOA via Hypertext Transfer Protocol, HTTP; and
acquiring the IPv4 address and IPv6 address of the FHA, and the information about the THOA and the IPv6 COA corresponding to the THOA in a bootstrapping manner, after the MN moves from an IPv6 network to an IPv4 network.

7. The method according to claim 5, wherein accepting, by the FHA, the MN to register the information about the THOA and information about an IPv4 COA acquired from an FA in the FHA, and registering the IPv6 COA corresponding to the THOA in a CN or HA, further comprises: after the MN moves from an IPv6 network to an IPv4 network,
accepting, by the FHA, the MN to register the IPv4 COA acquired from the FA by using MIP4 or through FA forwarding, and
registering the IPv6 COA corresponding to the THOA in the CN or HA by using MIP4 directly or by FHA replacement.

8. The method according to claim 5, wherein delivering a packet between the MN and the HA or CN, by the FHA, according to the information about the THOA and the IPv4 COA, further comprises:
  delivering an IPv6 packet destined for the HA or CN, by the IPv6 protocol stack of the MN, to the IPv4 protocol stack of the MN, the IPv4 protocol stack encapsulating the IPv6 packet into an IPv4 packet whose source address is the THOA and whose destination address is the IPv4 address of the FHA;
  sending, by the MN, the encapsulated IPv4 packet to the FA, which routes the IPv4 packet to the FHA; and
  upon receipt of the IPv4 packet, removing, by the FHA, the IPv4 encapsulation of the IPv4 packet, and forwarding the inner IPv6 packet to the HA or CN in an IPv6 network.

9. The method according to claim 8, wherein forwarding by the FHA the inner IPv6 packet to the HA or CN in an IPv6 network further comprises:
  sending a packet to be sent to the CN from the MN, by the FHA, first to the HA, which in turn forwards the packet to the CN, when the MN communicates with the CN by using a tunnel mode; and
  sending a packet to be sent to the CN from the MN, by the FHA, directly to the CN, when the MN communicates with the CN by using a route optimization mode.

10. The method according to claim 5, wherein delivering a packet between the MN and the HA or CN, by the FHA, according to the information about the THOA and the IPv4 COA, further comprises:
  routing a packet sent to the MN from the HA or CN to the FHA in an IPv6 network, and encapsulating, by the FHA, the packet into an IPv4 packet, the source address of which is the IPv4 address of the FHA and the destination address of which is the THOA;
  establishing a tunnel between the FHA and the MN's IPv4 COA, performing IPv4 tunnel encapsulation, by the FHA, on the IPv4 packet, and sending the tunnel encapsulated packet to the MN's IPv4 COA; and
  after receiving the tunnel encapsulated packet sent from the FHA, performing tunnel de-capsulation, by the MN, on the packet, to obtain the IPv4 packet encapsulated by the FHA, further decapsulating the IPv4 packet, and afterwards, handing the de-capsulated packet to the MN's IPv6 protocol stack, which processes the packet according to MIP6.

11. The method according to claim 10, wherein routing a packet sent to the MN from the HA or CN to the FHA in an IPv6 network further comprises:
  sending a packet to be sent from the CN to the MN to the HA first, which in turn forwards the packet to the FHA, when the MN communicates with the CN by using a tunnel mode; and
  sending a packet to be sent from the CN to the MN to the FHA directly when the MN communicates with the CN in a route optimization mode.

12. A system for a dual-stack Mobile Node (MN), to roam in an IPv4 network, comprising:
  the MN; and
  a Foreign Home Agent (FHA); wherein
  the MN is configured to
    acquire a temporary IPv4 address, a Temporary Home Address (THOA), and an IPv6 Care-of Address (COA) corresponding to the THOA,
    acquire an IPv4 COA; and
    register the IPv4 COA with the FHA;
  wherein the FHA is configured to
    provide the MN with information about IPv4 address and IPv6 address of the FHA, and information about the THOA assigned for the MN by the FHA and information about the Ipv6 COA corresponding to the THOA,
    accept, by the FHA, the MN to register the information about the THOA and information about the IPv4 COA acquired from a Foreign Agent (FA) in the FHA,
    register the IPv6 COA corresponding to the THOA in a Corresponding Node (CN) or a Home Agent (HA), and
    deliver a packet between the MN and the HA or CN, by the FHA, according to the information about the THOA and the IPv4 COA.

13. The system according to claim 12, wherein when delivering a packet between the MN and the HA or CN, the FHA de-capsulate a first IPv4 packet to be sent from the MN to the HA or CN, into a first IPv6 packet and send the first IPv6 packet to the HA or CN, and encapsulate a second IPv6 packet to be sent from the HA or CN to the MN into a second IPv4 packet and send the second IPv4 packet to the MN according to mapping relationship between the IPv4 COA and the THOA.

14. The system according to claim 12, wherein the MN is further configured to acquire the IPv4 address and IPv6 address of the FHA via HTTP or bootstrapping.

* * * * *